United States Patent Office 3,498,151
Patented Mar. 3, 1970

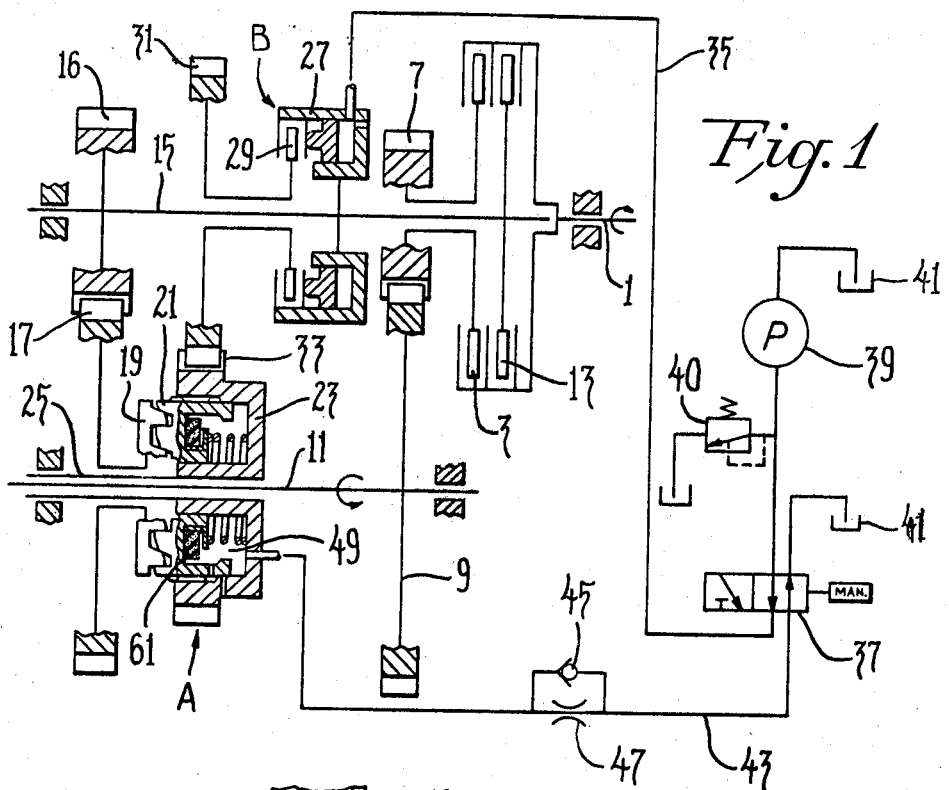
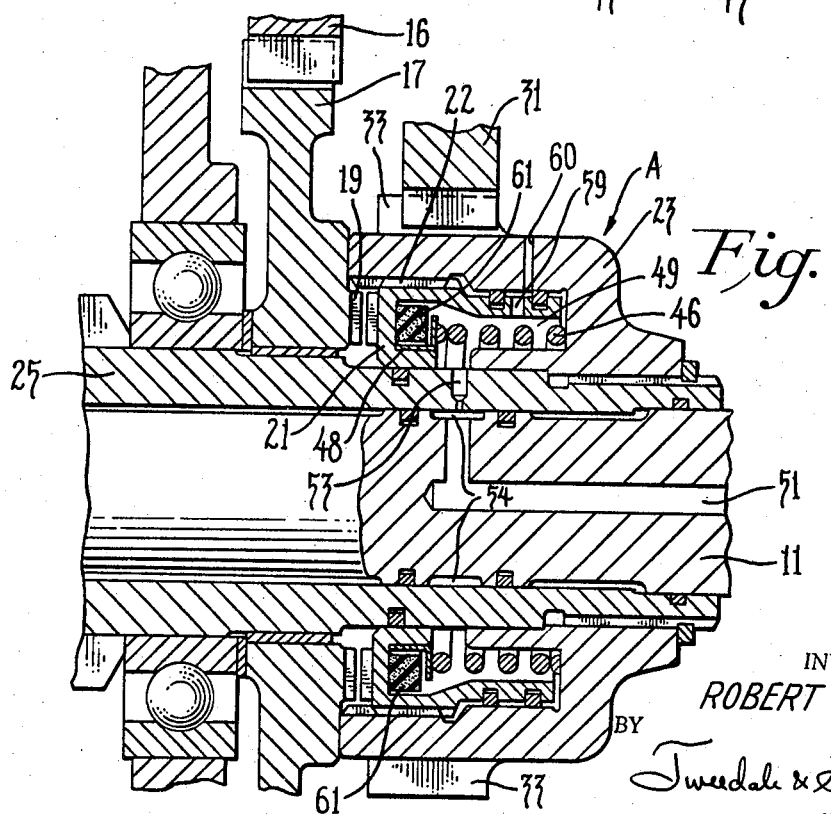

3,498,151
TRANSMISSION CLUTCH CONTROL APPARATUS
Robert W. King, Birmingham, Mich., assignor to Massey-Ferguson Inc., Des Moines, Iowa, a corporation of Maryland
Filed Feb. 19, 1968, Ser. No. 706,475
Int. Cl. F16h 3/16
U.S. Cl. 74—356                                    6 Claims

ABSTRACT OF THE DISCLOSURE

A change speed transmission employing jaw tooth type overrunning clutch means having hydraulic piston lock up means to prevent separation of jaw teeth when drive is through the clutch and permitting overrun when the drive is through another clutch. A variable volume device is provided to allow rapid separation of the jaw teeth when the other clutch takes over the drive without high fluid pressure build up on the piston and high loads on the jaw clutch teeth.

---

In order to provide for the easy shifting under torque between different speed ratios of a vehicle transmission such as that used in heavy duty vehicles, e.g. tractors, trucks, etc., there have been developed transmissions that incorporate overrunning or one-way drive clutches. By using such a clutch in combination with a two-way drive clutch it has been possible to provide a transmission in which at least some of the gear ratio changes can be made by merely moving a valve controlling a single fluid operated element. The overrunning clutch due to its torque directional characteristic, acts to automatically take over or release the drive through the transmission in response to the two-way drive clutch releasing or taking over the drive. In particular, the use of a jaw type clutch provides positive simple automatic torque or drive establishment without the problems associated with friction bands which require a relatively large diameter and require frequent adjustment for wear. Friction bands also require complex timing and pressure control of the band application and release. The use of a jaw clutch eliminates the service and cost problems associated with sprag or roller type overrunning clutches.

In order to overcome one inherent disadvantage of overrunning clutches, that is their inability to transmit torque in a reverse direction so as to take advantage of engine braking when the vehicle is coasting, it has been proposed to provide a lockout of the overrunning effect by use of a hydraulic piston means to hold the overrunning clutch teeth in two-way driving engagement. An example of a transmission incorporating such an arrangement is shown in U.S. Patent 3,302,475 entitled "Transmission With Lock Out of Overrun."

This hydraulic lockout of the overrunning effect is of course desirable only when the overrunning clutch is in torque transmitting engagement. Any tendency towards hydraulic lockout of the clutch when the clutch is disengaged will cause unnecessary ratcheting and high torque loads on the clutch. This is especially true where the overrunning clutch is of the jaw tooth type. In order to ensure that the hydraulic lockout of the overrunning effect of the clutch not act on the clutch during engagement of the teeth and during ratcheting thereof, a further development provided for a build up of pressure on the hydraulic lockout only when the teeth are in engagement. Such a configuration is covered in U.S. Patent 3,362,245 entitled "Power Shift Transmission."

While the arrangement shown in U.S. Patent 3,362,245 performs entirely satisfactorily, it has been found that during disengagement of the jaw teeth by the reverse torque action, there are some additional high torque loads on the teeth due to the fact that the tooth disengagement and consequent movement of the hydraulic piston occurs so rapidly that the fluid in the piston cylinder displaced by the moving piston cannot escape from the cylinder fast enough to prevent a momentary high pressure build-up and consequent prevention of complete separation of the clutch teeth. High loads and rapid tooth wear can result. Stated another way, the teeth begin to separate due to the tooth angles when one of the members begins to overrun the other but fluid or oil in the cylinder, even if not under pressure is in effect trapped therein. In a typical installation the shift will take place in from .005 to .015 second. Pressure build-up in the cylinder has been measured as high as 900 to 1000 p.s.i. which causes high tooth loads and rapid wear. Wear on the teeth of an overrunning jaw clutch can reduce the capacity of the clutch to transmit torque in its driving direction. As the teeth wear, the clutch eventually overruns in both directions.

It is therefore an object of this invention to provide an overrunning clutch of the jaw tooth type having a hydraulic lockout of the overrun and having means for limiting the pressure build-up in the hydraulic lockout due to separation of the jaw teeth.

A further object of the invention is to provide a transmission having an alternative drive through a two-way and a normal acting one-way clutch with means to condition the normal acting one-way clutch for two-way operation and to permit free one-way operation when the two-way clutch takes over the drive through the transmission from the normal one-way drive clutch.

These and other objects and advantages will be readily apparent from the following specification and accompanying drawings in which:

FIG. 1 is a schematic view of part of a transmission incorporating the invention;

FIG. 2 is an enlarged detail section view of a portion of the transmission.

One embodiment of the invention is shown in a portion of a transmission in the figures. An input shaft 1 is connectable through a friction clutch 3, gears 7 and 9 to a P.T.O. shaft 11. This construction forms no part of the invention but is commonly provided in transmissions used in agriculture and industrial applications.

A second friction clutch 13 connects the input shaft 1 to shaft 15 having gear 16 secured thereto. The gear 16 meshes with a larger gear 17 connected to a first jaw tooth clutch member 19. A cooperating second jaw tooth clutch member 21 is formed as an annular piston slidably mounted in and splined at 22 to a bell-shaped cylinder member 23. The jaw clutch elements together form an overrunning clutch unit hereinafter generally referred to as clutch A. The spline 22 may be helical to aid in separation of the members 21 and 23. The cylinder member 23 is connected to drive a countershaft 25 which would normally extend to the left of FIG. 1 to drive other components not shown of a complete transmission. Examples of such complete transmissions are shown in U.S. Patent 3,362,245 referred to above.

The shaft 15, in addition to driving the gear 16, acts to continuously drive a clutch input drive 27 having a driven disc clutch element 29 connected to drive a gear 31. The clutch elements 27 and 29 form a hydraulically operated friction clutch generally referred to as clutch B. Gear 31, which has a greater diameter than gear 16, constantly meshes with gear teeth 33 formed on the bell-shaped member 23 of clutch A.

The clutch B is fully controlled and the clutch A is partially controlled by a hydraulic control system as shown in FIG. 1. A hydraulic line 35 connects a control valve 37 with the clutch B. The valve 37 is in turn connected to a fluid pump 39. A relief valve 40 limits the pressure in the system and the pump draws fluid from a sump 41. The control valve 37 is also connected to the clutch A through line 43 having a one-way check valve 45 and orifice 47 therein. The valve 45 and restriction 47 serve to allow relatively fast flow of fluid from the clutch A to the valve 37 but permit only a relatively slow flow to the clutch A. The valve 37 is a two-position valve that alternatively connects the pump 39 either to clutch A or B and simultaneously connects the other clutch to the sump 41.

The jaw clutch members 19 and 21 are urged into engagement by a spring 46 acting on a sleeve 48 located in the jaw clutch piston member 21. The members 19 and 21 are at times also urged together, or more correctly held together, by fluid pressure coming from passage 51 formed in shaft 11 and which is connected to the line 43 leading to valve 37. Radial passage 53 connects groove 54 to the interior 49 of cylinder 21. The piston member 21 has a radial port 59 which in the piston shown in FIG. 2 connects with a port 60 in the bell-shaped member 23.

Located in the cylinder space 49 is a collapsible annular member 61 which can be of a number of different forms and material. It is shown as a closed cell rubber or neoprene member that has trapped air cells inside. Fluid pressure on the member 61 acts to compress the same to a volume considerably less than the expanded volume. Other collapsible members such as rubber tubing could be used.

Operation

With clutch 13 engaged power flows from the input shaft 1 to the shaft 15. If the valve 37 is positioned as shown in FIG. 1, pressure from pump 39 will be directed to the clutch 13 with gear 31 then being driven. Gear 31 drives the teeth 33 on member B which is connected to shaft 25. Since gear 31 drives member 33 faster than gear 16 drives gear 17 and connected jaw tooth member 19, the member 21 will overrun or rotate faster than the member 19. The tooth angle construction of members 19 and 21 is such that the axial forces on the teeth of member 21 will cause it to move against the spring 46 whereupon the radial faces of the teeth of one member will ride upon the radial faces of teeth on the other member. If the spline 22 is helically formed, it also results in an axial force on member 21 acting to move it away from 19 due to rotative driving force between the piston 21 and cylinder 23. At this time the chamber 49 is connected to exhaust both through ports 59, 60 and the valve 37. There is therefore no fluid pressure in cylinder 49 acting to urge the clutch teeth together.

If the valve 37 is shifted to its other position (to the right in FIG. 1) the fluid pressure acting on clutch B is released to sump 41 and fluid is directed through line 43 to the cylinder 23. Since ports 59 and 60 are still connected there can be no pressure build-up in chamber 49 at this time. As the clutch B releases the drive of gear 31, that gear member 23 and jaw clutch member 21 begin to slow down until they reach the speed of member 19 as it is driven by gears 16 and 17. At that time, the separating force between members 19 and 21 is reduced and spring 46 is able to move member 21 to the position shown in FIG. 1. The drive is then entirely through the clutch A.

As the clutch-piston member 21 moves to the left, as the view in the figures, port 60 is cut off and pressure builds up in cylinder space 49 until it reaches the pressure set by relief valve 40. This pressure is sufficient to hold the member 19 and 21 in positive driving relation even though the direction of torque through the members is reversed as would be the case with a vehicle coasting or slowing down. The drive would thus be complete back to the vehicle engine and engine braking would be available to slow the vehicle. When the pressure in chamber 49 builds up it acts on member 61 to compress the same to a fraction of its normal size. At this time there is therefore more fluid in the chamber 49 than the normal volume therein.

When the valve 37 is moved again to the position shown in FIG. 1, fluid is again directed to clutch B while the chamber 49 is connected to the sump 41. As the pressure in chamber 49 reduces, member 61 expands and aids in forcing fluid through the port 53 and line 51. Member 61 rapidly reaches its normal expanded size and volume displacement.

As soon as the pressure on clutch B builds up sufficiently so that it begins to carry the driving load, member 33 again begins to speed up and the toothed members immediately try to separate. This separation causes clutch piston member 23 to move to the right against the fluid in chamber 49. Since the port 59 is not connected with port 60 until the teeth are separated, the only escape for fluid is through port 53, passages 51, 43 and valve 37. Without member 61 in the chamber 49, the pressure would rise to a very high level because in order for the teeth to separate enough for overrun, the clutch piston must move a considerable distance and displace a relatively large volume of fluid. Since the tooth separation must take place in a relatively short time, i.e. five to fifteen thousandths of a second, the fluid cannot flow out of chamber 49 fast enough and the pressure would rapidly build up to a high level for a short time. This high pressure would cause a high tooth load and rapid wear.

Since member 61 in chamber 49 is in its expanded condition following the initial pressure drop in chamber 49 when valve 37 is conditioned to cause drive through clutch B, this member will, with the movement of piston 21, collapse as the pressure in chamber 49 rises. Thus the chamber 49 has in effect a secondary reserve volume available to allow rapid movement of piston 21 without a high build-up of pressure resisting such movement. As soon as the piston has moved to the position shown in FIG. 2, ports 59 and 60 permit flow of fluid and this extra relief coupled with the main relief through port 53 allows the pressure in chamber 49 to drop to zero and the member 61 then expands to its normal size.

The difference in volume of member 61 before and after collapsing should be chosen so that the pressure in chamber 49 does not build above a level sufficient to cause tooth wear during the shift. Obviously, if the difference in volume is equal to or greater than the piston displacement between tooth engaged and tooth disengaged conditions of the jaw clutch, then ideally there would be no pressure build-up in chamber 49 during disengagement of clutch A. Actually, a lesser volume change is needed since some fluid will flow through port 54. The actal optimum normal size and reduced size of member 61 can easily be determined by experiment and will vary depending on the size of the other components, sizes of ports, tooth angles, torques, speeds, etc.

As mentioned above the element in chamber 49 which allows movement of the piston without excessive build-up of pressure can take other forms than that shown. In general any structure that will substantially collapse under pressure and expand to its original size with a reduction in pressure can be used. Other modifications and applications will be readily apparent to those skilled in the art and are deemed to be included in the invention which is limited only by the following claims.

I claim:

1. A change speed transmission having a driving shaft and a driven shaft, a plurality of gear connections between said shafts, first drive establishing means operable to establish drive between said shafts through one of said gear connections, second drive establishing means operable to establish drive between shafts through another of said gear connections, said second drive establishing means including an overrunning jaw clutch of the type having a pair of rotatable members having cooperating teeth that provide positive drive between the members when one member is driven faster than the other member and act to separate and hence overrun when the other member is driven faster than said one member, means for preventing said cooperating teeth from separating including a fluid operated piston acting to urge said members toward each other, selective means for directing fluid pressure to act on said piston to prevent said separation, and fluid pressure accumulator means responsive to the pressure acting on said piston and acting to control the rate of pressure rise of the fluid acting on said piston caused by said teeth separating and positively moving said piston against the fluid acting on the same and when said selective means is not directing fluid pressure to act on said piston and when said teeth act to separate.

2. The change speed transmission of claim 1 wherein said piston is operable in a cylinder and wherein said pressure control means includes a pressure relief port formed in the cylinder, said port acting to relieve a portion of the pressure of the fluid from said selective means acting on said piston, and said piston acting to close said port when said cooperating teeth are in positive driving relationship.

3. The change speed transmission of claim 2 wherein said fluid pressure accumulator comprises a variable volume member in said cylinder having a predetermined normal expandable volume when subject to a relatively low fluid pressure and a predetermined collapsed volume when subjected to a relatively high fluid pressure, the difference between said predetermined volumes being sufficient to allow enough movement of said piston and displacement of fluid thereby to in turn allow disengagement of said teeth without the requirement that such piston movement displace fluid from said cylinder through said port.

4. The change speed transmission of claim 3 wherein said fluid pressure accumulator further comprises a flexible member having trapped gas therein.

5. The change speed transmission of claim 3 wherein said fluid pressure accumulator comprises a flexible member having a plurality of closed cells containing a gas.

6. An overrunning clutch assembly including a pair of rotatable members having cooperating jaw teeth that are urged into engagement by a bias force to provide positive drive between the members when one member is driven faster than the other member and normally act to separate against said bias force and hence overrun when the other member is driven faster than said one member, means for preventing said drive establishing means from overrunning including a fluid pressure operated piston acting to prevent separation of said teeth, selective means to direct fluid under pressure to said piston, said piston and a cylinder in which said piston is mounted forming a variable volume means having a first predetermined volume, an additional variable volume means having a second predetermined volume in said cylinder and collapsible under pressure, for providing additional volume variation when the pressure in said cylinder acting on said piston increases due to displacement of said piston by said teeth separating against said bias force.

References Cited

UNITED STATES PATENTS

| | | | |
|---|---|---|---|
| 3,187,870 | 6/1965 | Sabatini | 192—46 X |
| 3,262,527 | 7/1966 | Allaben | 192—58 |
| 3,335,836 | 8/1967 | Swanson | 192—109 X |
| 3,362,245 | 1/1968 | Francuch et al. | 192—46 X |

ARTHUR T. McKEON, Primary Examiner

U.S. Cl. X.R.

74—359, 368; 192—46, 85, 109